United States Patent [19]
Everett et al.

[11] Patent Number: 5,715,918
[45] Date of Patent: Feb. 10, 1998

[54] ELASTICALLY LATCHED AND STAKED ASSEMBLY IN A KINEMATIC ARRANGEMENT OF AN AUTOMATIC TRANSMISSION

[75] Inventors: Nathan A. Everett, Canton; Timothy Raphael Allen, Livonia, both of Mich.

[73] Assignee: Ford Global Technologies, Inc., Dearborn, Mich.

[21] Appl. No.: 723,333

[22] Filed: Sep. 30, 1996

[51] Int. Cl.$^6$ .................................................. F16D 41/04
[52] U.S. Cl. .................... 192/48.92; 192/70.2; 403/279
[58] Field of Search .................... 192/48.92, 70.19, 192/70.2; 475/331; 403/274, 279, 282

[56] References Cited

U.S. PATENT DOCUMENTS

| | | | |
|---|---|---|---|
| 4,188,800 | 2/1980 | Fujita et al. | 403/274 X |
| 4,883,152 | 11/1989 | Froment | 192/48.92 X |
| 4,949,824 | 8/1990 | Buckley et al. | 192/48.92 X |
| 4,983,066 | 1/1991 | Becker et al. | 403/274 |
| 5,069,574 | 12/1991 | Mikeska | 403/274 |
| 5,275,268 | 1/1994 | Masuda | 192/48.92 |
| 5,325,948 | 7/1994 | Prud'Homme | 192/70.19 X |
| 5,328,773 | 7/1994 | Scott | 403/282 X |
| 5,511,642 | 4/1996 | Klotz et al. | 192/48.92 X |

OTHER PUBLICATIONS

Ford 1995 Service Manual for Contour and Mystique Vehicles, pp. 07-01-133 to 07-01-137.

*Primary Examiner*—Charles A. Marmor
*Assistant Examiner*—Saúl J. Rodriguez
*Attorney, Agent, or Firm*—Frank G. McKenzie

[57] ABSTRACT

An assembly of components that includes a sun gear having several radial shoulders as a reference for the location of other components, an overrunning coupling having a surface contacting one of the shoulders, a spline engaging a spline formed on the sun gear, and a clutch hub having tabs that are elastically deformed from an inclined position to a substantially radial position in order to seat within a groove and to contact the second and third shoulders of the sun gear.

8 Claims, 3 Drawing Sheets

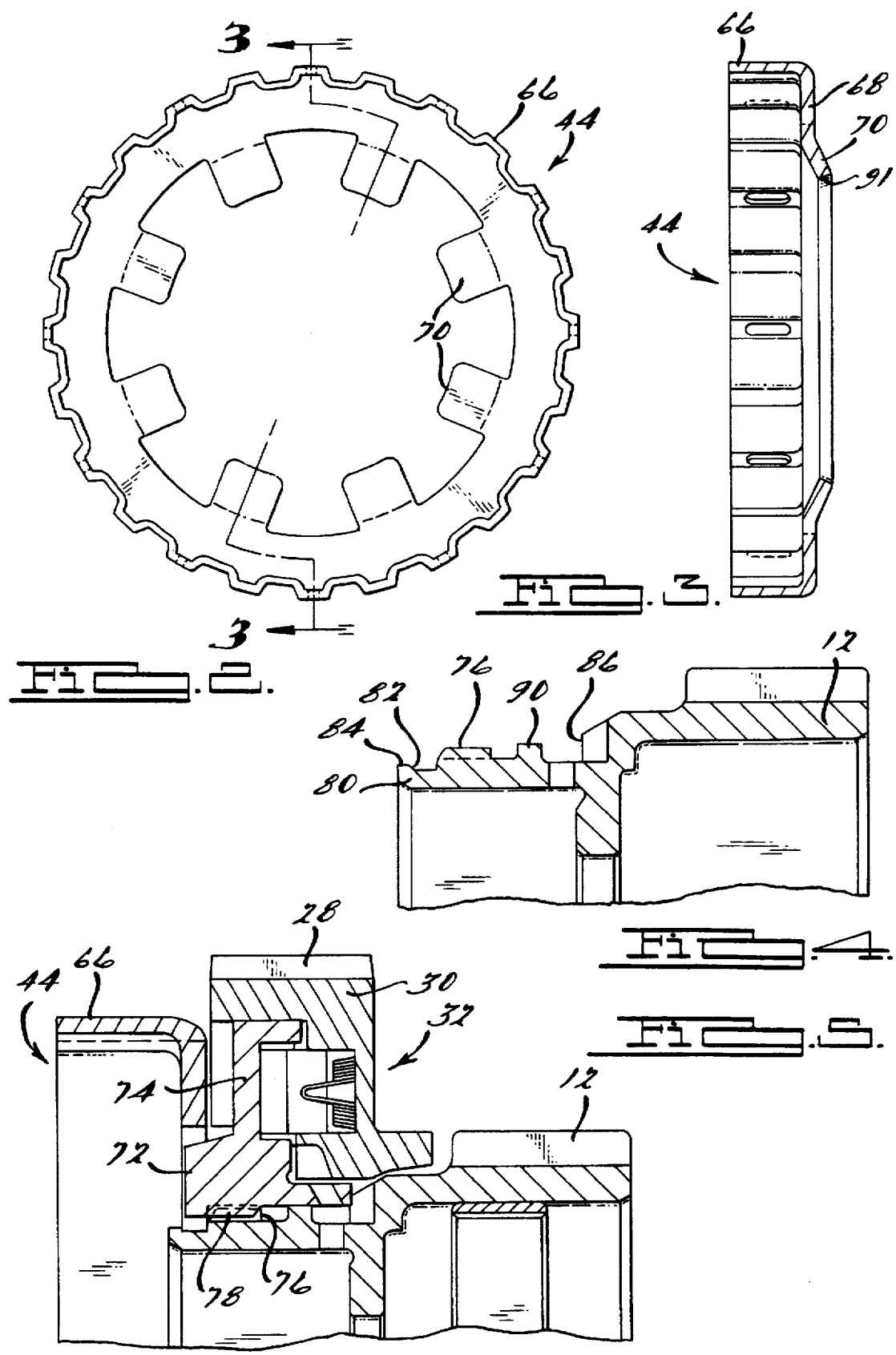

5,715,918

1

ELASTICALLY LATCHED AND STAKED ASSEMBLY IN A KINEMATIC ARRANGEMENT OF AN AUTOMATIC TRANSMISSION

BACKGROUND OF THE INVENTION

1. Technical Field

This invention relates to the field of gear and clutch arrangements for automatic transmissions of motor vehicles, and more particularly it pertains to an assembly of components in such arrangements.

2. Description of the Prior Art

A conventional technique for connecting components of the kinematic arrangement of an automatic transmission involves the use of retaining rings for fixing adjacent components in the correct axial relationship and connecting against relative rotation by fitting tabs located at an axial end of one component within drive lugs extending from an adjacent axial face of another component. For example, a low-intermediate sun gear is connected to the inner race of a forward one-way clutch by installing a retaining ring to connect those components and then installing a forward one-way clutch retainer. Next, an assembly comprising a forward one-way sprag clutch assembly and end caps located at each axial end of the sprag assembly is formed, and the sprag assembly is connected to the outer race of a forward one-way clutch. Next, the outer race and sprag assembly are installed on the forward one-way clutch inner race. Finally, a coast clutch hub having radially directed tabs is driveably connected to the inner race of the one-way clutch by fitting the hub tabs between drive lugs that extend from the axial face of a one-way clutch assembly. A retaining ring is fitted into a groove formed on the surfaces of the lugs to hold the assembly in place.

This assembly is described and illustrated in Ford 1995 Service Manual for Contour and Mystique vehicles, at pages 07-01-133 to 07-01-137.

SUMMARY OF THE INVENTION

A device according to this invention allows for assembly and axial retention of several parts without use of an internal snap ring or a similar retainer. Instead, a clutch hub with staking tabs retains the notch plate of an overrunning clutch, which is pressed onto a sun gear. The face of the notched plate contains drive lugs that engage with the tabs of the hub to prevent rotation of the hub with respect to the notch plate.

The tabs are initially set at an angle that allows them to slip over the outer diameter of the sun gear. Then, the hub is axially pressed toward the pocket plate of the overrunning clutch, thereby causing the tabs to straighten and stake into a groove formed on the sun gear. The groove includes a chamfered surface that engages the tabs as they elastically straighten by bending, thereby eliminating any axial and radial tolerances.

In realizing these advantages and objects, an assembly according to the present invention includes a first component arranged about and axis, having a first surface facing a first direction, a second surface facing a second direction axially opposite the first direction, drive lugs angularly spaced mutually about the axis and extending axially from said first surface. A second component has a first shoulder facing the second direction, a second shoulder facing the first direction, and a groove located adjacent the drive lugs and bounded by the second shoulder. A third component has tabs angularly spaced mutually about the axis, inclined with respect to the radial direction when the tabs are in a first condition and elastically displaceable to a substantially radial position, each tab adapted to fit in a space between successive drive lugs, to pass axially over the first shoulder in the first condition, and to enter the groove and contact the first shoulder when the tabs are deformed from the first condition.

BRIEF DESCRIPTION OF THE DRAWINGS

FIG. 2 is a front view of a clutch hub showing the tabs extending radially inwardly and splines formed on the outer surface.

FIG. 3 is a side view of the clutch hub of FIG. 4.

FIG. 4 is a cross section showing details of the sun gear and groove that is engaged by the tabs of the clutch hub.

FIG. 5 is a cross section through a clutch hub, overrunning coupling, and sun gear assembly according to this invention.

DESCRIPTION OF THE PREFERRED EMBODIMENT

Figure 1:
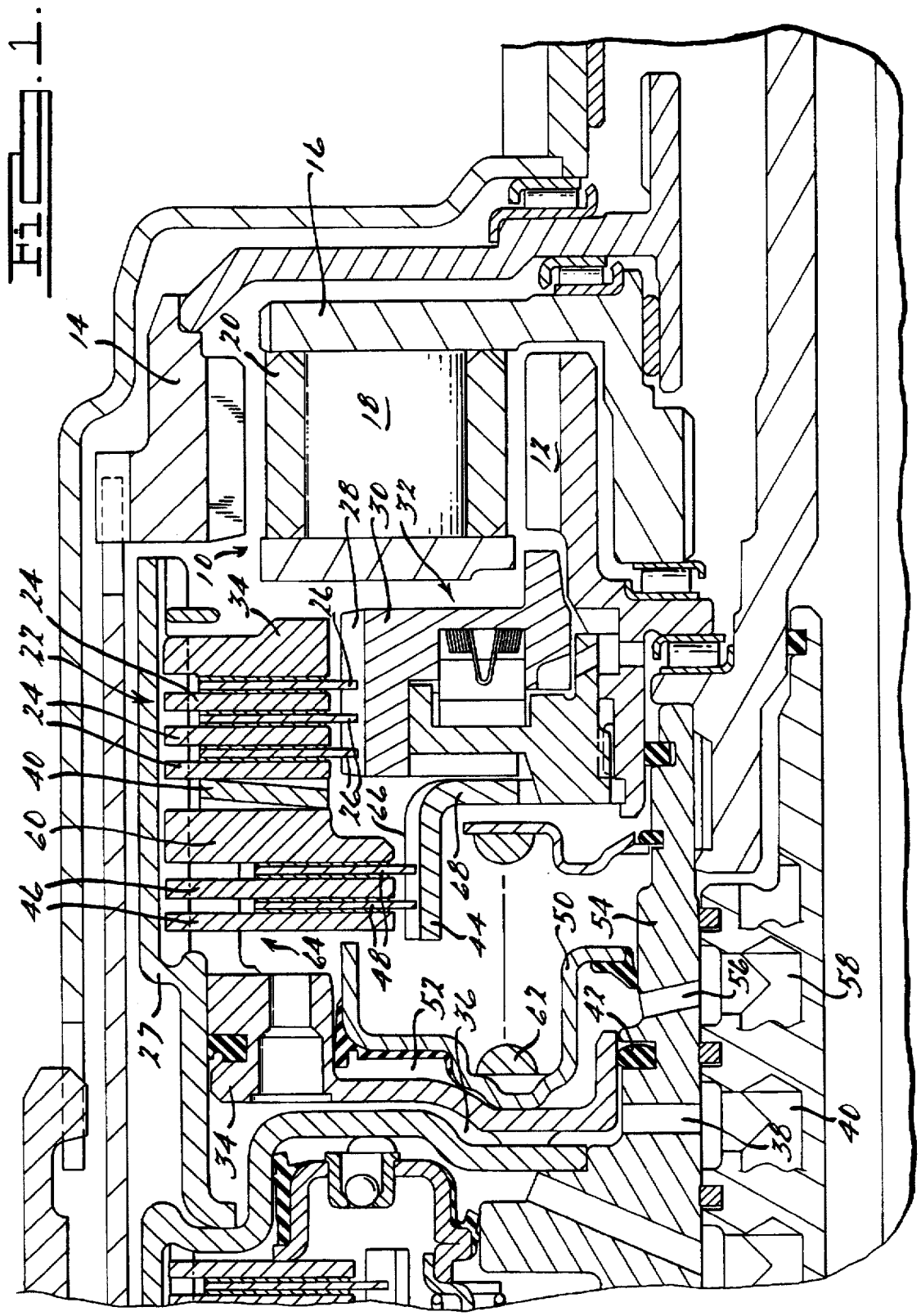
FIG. 1 is a cross section of a portion of a kinematic arrangement of an automatic transmission showing the assembled components of the present invention in their installed position, the assembly being substantially symmetric about a longitudinal axis.

Referring first to FIG. 1, a planetary gear unit 10 includes a sun gear 12; a ring gear 14 surrounding the sun gear; a carrier 16 adapted to rotatably support a set of planet pinions (not shown), which are in continuous meshing engagement with the sun gear and ring gear and supported rotatably on the stub shaft 18; and a set of needle bearings 20 supported on the stub shaft. A forward clutch 22, a hydraulically actuated friction clutch, includes a first set of spacer plates 24 fixed against rotation by engagement with a spline formed on the inner surface of a member 27, and a second set of friction discs, located between each of the spacer plates and fixed against rotation on the outer spline of a pocket plate 30, the outer race of an overrunning coupling 32. A pressure plate 34, also engaged with the spline on member 27, reacts the force applied to clutch 22 when hydraulic piston 34 is moved rightward due to the effect of hydraulic pressure applied to a cylinder 36, within which piston 34 moves. Pressurized hydraulic fluid is carried from the hydraulic control system of the transmission through lines 38 and 40 in order to engage clutch 22 and is vented through those lines to disengage the clutch. When cylinder 36 is vented, a wave spring 40 forces piston 34 leftward, thereby removing the frictional engagement of clutch discs 24 and 26. An hydraulic seal 42 dynamically seals the space between the cylinder of the forward clutch 22 and clutch piston 34 to prevent passage of hydraulic fluid.

The coast clutch 64, adapted to alternately engage and release member 26 and hub 44, includes a first set of spacer plates 46, splined to member 27, and a set of friction plates 48, splined to the outer surface of clutch hub 44. Coast clutch piston 50 moves rightward within a cylinder 52, bounded by the inner surfaces of piston 34 and member 54, where pressurized hydraulic fluid is supplied to the cylinder 52 through passages 56, 58. Piston 50 carries hydraulic seals which move with the piston on the surface of the cylinder 52 to prevent the passage of hydraulic fluid. Piston 50 forces plates 44, 48 into frictional engagement against pressure plate 60 when cylinder 52 is pressurized, thereby driveably connecting hub 44 and member 27. When cylinder 52 is vented, compression spring 62 forces piston 50 leftward away from contact with the spacer plates and into contact with piston 34, thereby disengaging coast clutch 64 and allowing member 27 and hub 44 to rotate independently.

FIGS. 2 and 3 illustrate important details of coast clutch hub 44. The outer cylindrical surface is formed with a system of axially directed splines 66, adapted to driveably engage the internally splined surfaces formed on friction plates 48. The outer splined surface extends axially rightward to a radially directed web 68, from which multiple tabs 70 extend with an inclination that is both axial and radial when the tabs are in their "as formed" condition, i.e., before being bent during assembly to the position of FIG. 1. The tabs are spaced mutually angularly about the axis of the hub, and each tab is located in a space between successive drive lugs 72 formed on the notch plate 74 and spaced angularly about the axis. The engagement of the drive lugs 72 and tabs 70 driveably connect hub 44 and notch plate 74 so that relative rotation is prevented when the hub is assembled over the notch plate as described below.

Referring now to FIG. 4, sun gear 12 includes axially directed splines 76, which are adapted to engage internal splines 78 formed on the notch plate 74. The sun gear includes a groove 80, a chamfered surface 82 located at the left-hand end of the groove, and a shoulder 84 located at the left-hand end of the groove. A second shoulder 86 facing leftward provides a blocking surface that establishes the correct axial position of the notch plate relative to the sun gear. Shoulder 90 guides movement of the notch plate over the sun gear and establishes its correct radial position relative to the sun gear.

An assembly comprising the sun gear 12, overrunning coupling 32, and coast clutch hub 44 is illustrated in FIG. 5. The spline 76 of the sun gear and spline 78 of the notch plate are mutually driveably engaged and the parts fitted in the correct axial position by sliding the notch plate rightward on shoulder 90 until the right-hand end of notch plate 74 contacts shoulder 86, thereby establishing the correct axial and radial positions of the sun gear relative to the notch plate.

Figure 6:
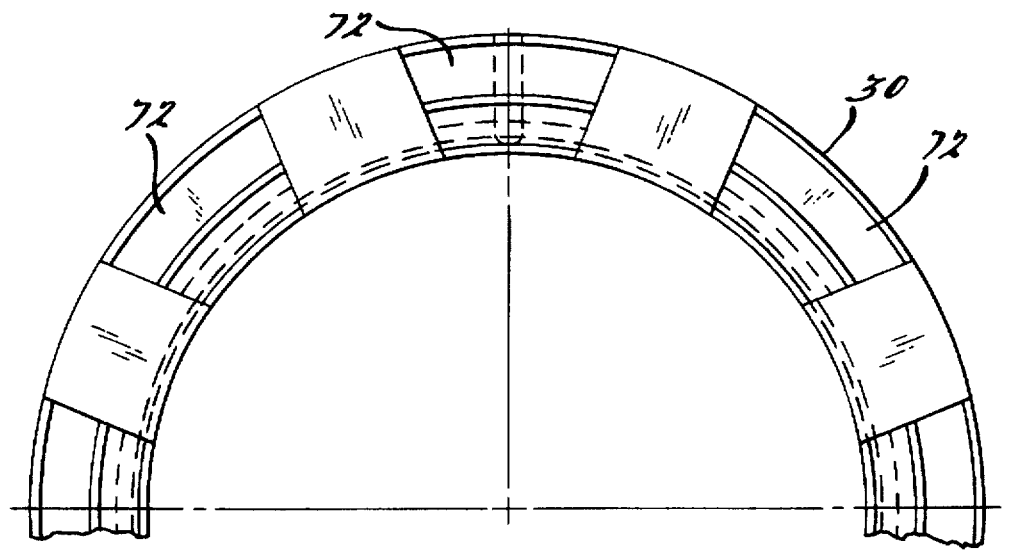
FIG. 6 is a partial front view of the overrunning clutch showing the drive lugs.
Figure 7:
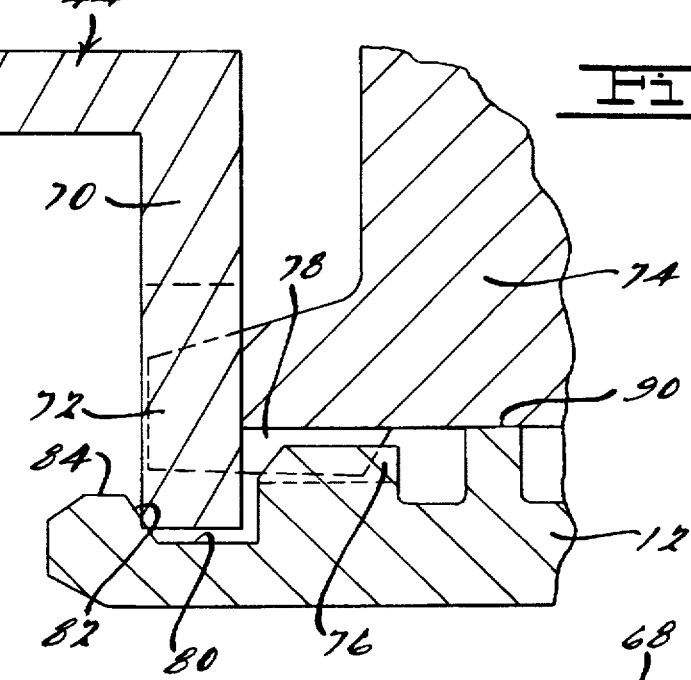
FIG. 7 is a side view similar to that of FIG. 5 showing details of the tab-sun gear engagement.
Figure 8:
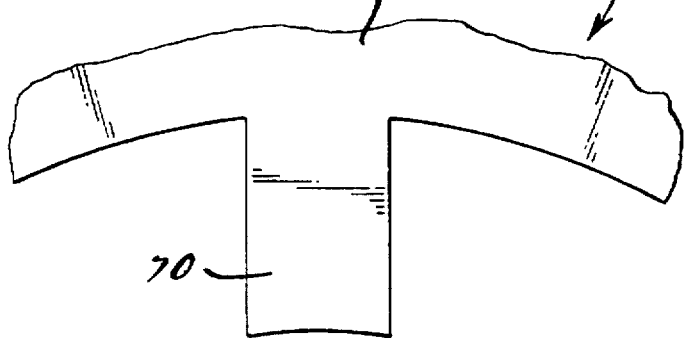
FIG. 8 is a front view of a clutch hub tab after bending to a radial position.

After the sun gear and overrunning coupling are correctly located, the sun gear is fixed against axial movement until the assembly is completed. Coast clutch hub 44, in the form shown in FIGS. 3 and 6, is moved laterally toward the sun gear so that the tabs 70 clear the shoulder 84 on the sun gear and are each located between successive drive lugs 72. Then, hub 44 is forced into contact with the notch plate 74. This action will bend each tab to a substantially radial position and cause the radially inner ends of the tabs 70 to engage the inclined, chamfered surface 82 on shoulder 84 at the left-hand end of groove 80. When this occurs, the tabs 72 are held in the groove and latch the hub to the sun gear due to the elastic preload developed by elastically displacing the tabs. This prevents relative axial displacement of the hub, ring gear, and overrunning clutch, thereby forming a subassembly of these components that can be carried as a unit and installed in the transmission.

Preferably, the coast clutch hub is formed of SAE J403 1020 steel. An assembly has been formed successfully as described with components having the following dimensions: the angular width of the tabs is approximately 10.63 mm, the length of the tabs is about 20 mm from the base of the web, and the thickness of the hub material is about 1.4 mm. In the process of assembly, a force of approximately 600–1000 pounds is applied axially to the clutch hub in order to deflect the tabs and to correctly locate and seat the tabs within the sun gear groove. The overrunning clutch, preferably made of powdered metal, is of the type described in U.S. Pat. No. 5,070,978, and is available commercially from Brenco Incorporated, of Petersburg, Va.

The form of the invention shown and described herein constitutes the preferred embodiment of the invention; it is not intended to illustrate all possible forms thereof. The words used are words of description rather than of limitation, and various changes may be made from that which is described here without departing from the spirit and scope of the invention.

We claim:

1. In an automatic transmission for motor vehicles, an assembly arranged about an axis comprising:

an overrunning clutch for producing a one-way drive connection therebetween, having a first surface facing a first direction, a second surface facing a second direction axially opposite the first direction, drive lugs angularly spaced mutually about the axis and extending axially from said first surface;

a gear having a first shoulder facing the second direction, a second shoulder facing the first direction, a groove located adjacent the drive lugs; and a hub having radially directed, elastically displaced tabs angularly spaced mutually about the axis, each tab located in a space between successive drive lugs and biasing the second surface into contact with the second shoulder, a free end of each tab located in the groove and contacting the first shoulder.

2. The assembly of claim 1, wherein the gear and first race have mutually engaged spines adapted to prevent relative rotation therebetween.

3. In an automatic transmission for motor vehicles, an assembly comprising:

an overrunning clutch having a first race and second race arranged about an axis, for producing a one-way drive connection therebetween, having a first surface facing a first direction, a second surface facing a second direction axially opposite the first direction, drive lugs angularly spaced mutually about the axis and extending axially from said first surface;

a gear having a first shoulder facing the second direction, a second shoulder facing the first direction, a groove located adjacent the drive lugs; and a hub having tabs angularly spaced mutually about the axis, inclined toward the with respect to the radial direction when the tabs are in a first condition and elastically deformable to a substantially radial direction, each tab adapted to fit in a space between successive drive lugs, to pass axially over the first shoulder in the formed condition, and to enter the groove and contact the first shoulder when the tabs are deformed from the first condition.

4. The assembly of claim 3, wherein the gear and first race have mutually engaged spines adapted to prevent relative rotation therebetween.

5. An assembly comprising:

a first component having a first surface facing a first direction, a second surface facing a second direction axially opposite the first direction, drive lugs angularly spaced mutually about the axis and extending axially from said first surface;

a second component having a first shoulder facing the second direction, a second shoulder facing the first direction a groove located adjacent the drive lugs; and a third component having radially directed, elastically displaced tabs angularly spaced mutually about the axis, each tab located in a space between successive drive lugs, biasing the second surface into contact with the second shoulder, a free end of each tab located in the groove and contacting the first shoulder.

6. The assembly of claim 5, further comprising means for driveably engaging second component and first component.

7. An assembly comprising:

a first component arranged about and axis, having a first surface facing a first direction, a second surface facing a second direction axially opposite the first direction, drive lugs angularly spaced mutually about the axis and extending axially from said first surface;

a second component having a first shoulder facing the second direction, a second shoulder facing the first direction, a groove located adjacent the drive lugs and bounded by the second shoulder; and a third component having tabs angularly spaced mutually about the axis, inclined with respect to the radial direction when the tabs are in a first condition and elastically displaceable to a substantially radial position, each tab adapted to fit in a space between successive drive lugs, to pass axially over the first shoulder in the formed condition, and to enter the groove and contact the first shoulder when the tabs are deformed from the first condition.

8. The assembly of claim 7, wherein the first component and second component have mutually engaged spines adapted to prevent relative rotation therebetween.

* * * * *